United States Patent [19]

Nemoto

[11] Patent Number: 5,876,058
[45] Date of Patent: Mar. 2, 1999

[54] AIR BAG MODULE

[75] Inventor: Hiroshi Nemoto, Mesa, Ariz.

[73] Assignee: TRW Vehicle Safety Systems Inc., Lyndhurst, Ohio

[21] Appl. No.: 923,621

[22] Filed: Sep. 4, 1997

[51] Int. Cl.⁶ .................................................. B60R 21/16
[52] U.S. Cl. ........................................ 280/728.2; 280/732
[58] Field of Search ........................... 280/728.2, 728.3, 280/731, 732

[56] References Cited

U.S. PATENT DOCUMENTS

| | | | |
|---|---|---|---|
| 5,306,039 | 4/1994 | Nakayama | 280/732 |
| 5,312,129 | 5/1994 | Ogawa | 280/728.2 |
| 5,456,488 | 10/1995 | Bayer | 280/728.1 |
| 5,611,562 | 3/1997 | Kelley et al. | 280/728.2 |
| 5,788,266 | 8/1998 | Rose et al. | 280/728.2 |

Primary Examiner—Paul N. Dickson
Attorney, Agent, or Firm—Tarolli, Sundheim, Covell, Tummino & Szabo

[57] ABSTRACT

An apparatus (10) includes a plurality of parts which are clamped together by a fastener (24). The clamped parts include a reaction canister (16), an air bag (12) inside the canister (16), a retainer frame (60) inside the air bag (12), and a retainer sleeve (102 or 116) outside the canister (16). The fastener (24) extends through the retainer sleeve (102 or 116). The apparatus (10) further includes a deployment structure (18) supported for limited movement relative to the canister (16). A panel portion (70) of the deployment structure (18) extends across a deployment opening (48) in the canister (16). A mounting portion (72 or 74) of the deployment structure (18) projects from the panel portion (70). The retainer sleeve (102 or 116) extends through an aperture (96) in the mounting portion (72 or 74) of the deployment structure (18), and is spaced fully from the deployment structure (18) within the aperture (96). In this arrangement, clearance for movement of the deployment structure (18) is provided about the periphery of the retainer sleeve (102 or 116).

5 Claims, 2 Drawing Sheets

AIR BAG MODULE

FIELD OF THE INVENTION

The present invention relates to an air bag module, and particularly relates to a structure for interconnecting parts of an air bag module.

BACKGROUND OF THE INVENTION

An air bag is in inflated when a vehicle experiences a crash. Inflation fluid is then directed to flow from an inflator into the air bag to inflate the air bag. When the air bag is inflated, it extends into the vehicle occupant compartment to protect an occupant of the vehicle from a forceful impact with parts of the vehicle as a result of the crash.

An air bag and an inflator are typically installed in a vehicle as parts of an air bag module. The module includes a reaction canister for containing the air bag and the inflator. The module may also include a deployment structure attached to the canister. The deployment structure includes a deployment panel which covers the air bag in the canister.

The air bag module is mounted in the vehicle by fastening the canister to a part of the vehicle, such as the instrument panel. The deployment panel then extends across an opening in the instrument panel to conceal the air bag and the other parts of the module from view in the vehicle occupant compartment. The deployment panel should fit closely within the opening so as to have the appearance of a continuous part of the instrument panel. Therefore, it may be desirable for the deployment structure to be movable slightly relative to the canister for fitting of the deployment door with the instrument panel or other vehicle part in which the module is mounted.

SUMMARY OF THE INVENTION

In accordance with the present invention, an apparatus comprises a plurality of parts which are clamped together by a fastener. The clamped parts include a reaction canister, an air bag inside the canister, a retainer frame inside the air bag, and a retainer sleeve outside the canister. The fastener extends through the retainer sleeve.

The apparatus further comprises a deployment structure which is supported for limited movement relative to the canister. A panel portion of the deployment structure extends across a deployment opening in the canister. A mounting portion of the deployment structure projects from the panel portion. The retainer sleeve extends through an aperture in the mounting portion of the deployment structure, and is spaced fully from the deployment structure within the aperture. In this configuration, clearance for limited movement of the deployment structure is provided about the periphery of the retainer sleeve.

In a preferred embodiment of the present invention, the aperture is one of a plurality of equally sized apertures in a row extending along the mounting portion of the deployment structure. The retainer sleeve is one of a row of equally sized sleeves projecting from a retainer strip. The sleeves extend from the strip to the canister through the apertures in the deployment structure. The fastener is one of a plurality of rivets, each of which has a grip extending from an inner side of the retainer frame to an outer end of a retainer sleeve.

BRIEF DESCRIPTION OF THE DRAWINGS

The foregoing and other features of the present invention will become apparent to one skilled in the art upon reading the following description with reference to the accompanying drawings, wherein.

DESCRIPTION OF A PREFERRED EMBODIMENT

Figure 1:
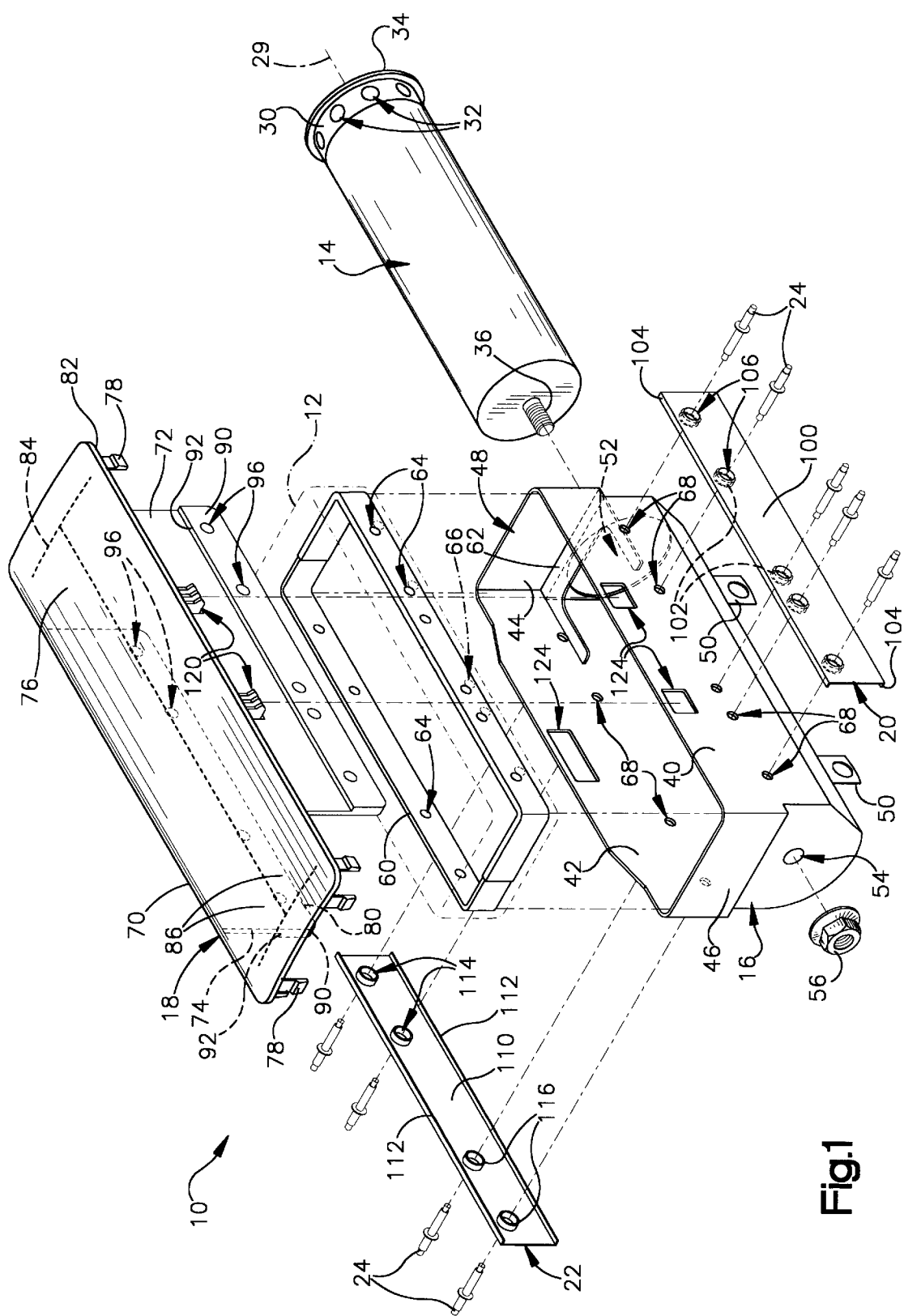
FIG. 1 is an exploded isometric view of parts of an air bag module comprising a preferred embodiment of the present invention.

An air bag module 10 comprising a preferred embodiment of the present invention comprises a plurality of parts which are shown in FIG. 1. These include an air bag 12 (shown schematically), an inflator 14, and a reaction canister 16 for containing the air bag 12 and the inflator 14. The parts of the module 10 further include a deployment structure 18, as well as a pair of retainer structures 20 and 22 with fasteners 24. When the inflator 14 and the air bag 12 are received in the canister 16, the deployment structure 18 is received over the air bag 12. The retainer structures 20 and 22 and the fasteners 24 are then used to fasten the air bag 12 and the deployment structure 18 to the canister 16.

The inflator 14 comprises a source of inflation fluid for inflating the air bag 12. The inflator 14 may thus contain ignitable gas generating material for generating a large volume of inflation gas. The inflator 14 may alternatively contain a stored quantity of pressurized inflation fluid, or a combination of pressurized inflation fluid and ignitable material for heating the inflation fluid. As known in the art, the inflator 14 is a cylindrical part with a longitudinal central axis 29. An outlet manifold 30 at one end of the inflator 14 has a circumferentially extending array of inflation fluid outlet openings 32. A peripheral mounting flange 34 projects radially from the manifold 30. A screw-threaded mounting stud 36 projects axially from the opposite end of the inflator 14.

The canister 16 is a trough-shaped part with a pair of opposite side walls 40 and 42 and a pair of opposite end walls 44 and 46. These walls 40–46 of the canister 16 define a generally rectangular deployment opening 48 extending fully along the length and across the width of the canister 16. A plurality of mounting brackets 50, two of which are shown in FIG. 1, are used to mount the canister 16 on a structural portion of a vehicle part such as, for example, a vehicle instrument panel.

The inflator 14 is movable into the canister 16 through a circular opening 52 in the first end wall 44 of the canister 16. The inflator 14 is thus movable into the canister 16 to an installed position in which the mounting flange 34 abuts the first end wall 44. The mounting stud 36 projects outward through a smaller circular opening 54 in the second end wall 46. A nut 56 is received on the stud 36 to secure the inflator 14 in its installed position in the canister 16.

As shown schematically in FIG. 1, the air bag 12 is folded in a generally rectangular configuration with a peripheral size closely matching that of the deployment opening 48. A rectangular retainer frame 60 is received within the air bag 12 in a known manner. The retainer frame 60 has a peripheral size which is slightly less than that of the deployment opening 48. Accordingly, the retainer frame 60 and the adjacent portion of the air bag 12 are receivable together through, and fit closely within, the deployment opening 48. A substantial portion of the folded air bag 12 may project outward from the deployment opening 48. A plurality of shoulder structures 62, one of which is shown in FIG. 1, limit movement of the air bag 12 and the retainer frame 60 inward of the canister 16.

The retainer frame 60 has a plurality of apertures 64 formed in its opposite sides. The apertures 64 in the retainer frame 60 are aligned with corresponding apertures 66 in the air bag 12. When the air bag 12 and the retainer frame 60 are installed in the canister 16, as described above, the apertures 64 and 66 are aligned with additional apertures 68 in the side walls 40 and 42 of the canister 16.

The deployment structure 18 in the preferred embodiment of the present invention comprises a deployment panel 70 and a pair of mounting walls 72 and 74 projecting from the deployment panel 70. The deployment panel 70 preferably has a class A outer side surface 76, and has a peripheral size and shape closely matching the peripheral size and shape of an opening in the vehicle part in which the air bag module 10 is to be installed. The deployment panel 70 in the preferred embodiment is thus sized and shaped to fit closely within a generally rectangular opening in a trim portion of a vehicle instrument panel. A plurality of mounting tabs 78 project from an inner side surface 80 of the deployment panel 70 near the peripheral edge 82 of the deployment panel 70. The mounting tabs 78 snap into engagement with the instrument panel in a known manner.

A notch 84 extends along the inner side surface 80 of the deployment panel 70. The notch 84 is elongated in an H-shaped configuration delineating a pair of deployment doors 86 in the deployment panel 70. As known in the art, the notch 84 defines a coextensive stress riser which ruptures under the influence of the air bag 12 to enable the deployment doors 86 to pivot open when the air bag 12 is being inflated. The number and configuration of the deployment doors 86, as well as the peripheral size and shape of the deployment panel 70, could differ in accordance with differing vehicle parts and/or locations in which the module 10 is to be installed in a vehicle.

The mounting walls 72 and 74 project equal distances downward, as viewed in FIG. 1, from the inner side surface 80 of the deployment panel 70. Each of the mounting walls 72 and 74 has an elongated lower edge portion 90. Each lower edge portion 90 has an upwardly facing shoulder surface 92 extending along its entire length. Each lower edge portion 90 further has a plurality of circular apertures 96 in a row extending along its length. Although the apertures 96 are all of equal size, the number and spacing of the apertures 96 at the first mounting wall 72 differ from the number and spacing of the apertures 96 at the second mounting wall 74.

The first retainer structure 20 comprises a rectangular strip 100 and a plurality of cylindrical sleeves 102. The strip 100 has a pair of longitudinally elongated flanges 104 projecting toward the canister 16. The strip 100 further has a plurality of circular apertures 106 which are spaced apart in a row extending along its length. Each sleeve 102 is coaxial with a corresponding aperture 106, and projects from the strip 100 toward the canister 16.

Like the first retainer structure 20, the second retainer structure 22 comprises a rectangular strip 110 with a pair of flanges 112 and a row of circular apertures 114, and further comprises a plurality of cylindrical sleeves 116 projecting from the strip 110 toward the canister 16 at locations coaxial with the apertures 114. The sleeves 102 and 116 are all of equal size. However, the number and spacing of the sleeves 116 on the second retainer structure 22 differ from the number and spacing of the sleeves 102 on the first retainer structure 20.

The deployment structure 18 is received over the air bag 12 when the air bag 12 and the retainer frame 60 have been moved into the canister 16 through the deployment opening 48, as described above. The deployment panel 70 then extends across and beyond the periphery of the deployment opening 48. The first and second mounting walls 72 and 74 overlie the first and second side walls 40 and 42 of the canister 16, respectively, at the outside of the canister 16. The apertures 96 in the mounting walls 72 and 74 are aligned with corresponding apertures 68 in the side walls 40 and 42. Accordingly, each of the apertures 96 is further aligned with a corresponding pair of the apertures 64 and 66 in the retainer frame 60 and the air bag 12. The deployment structure 18 is initially held in place by three sets of flexible holder tabs 120 (two of which are shown in FIG. 1) that snap through three corresponding openings 124 in the canister 16.

Figure 2:
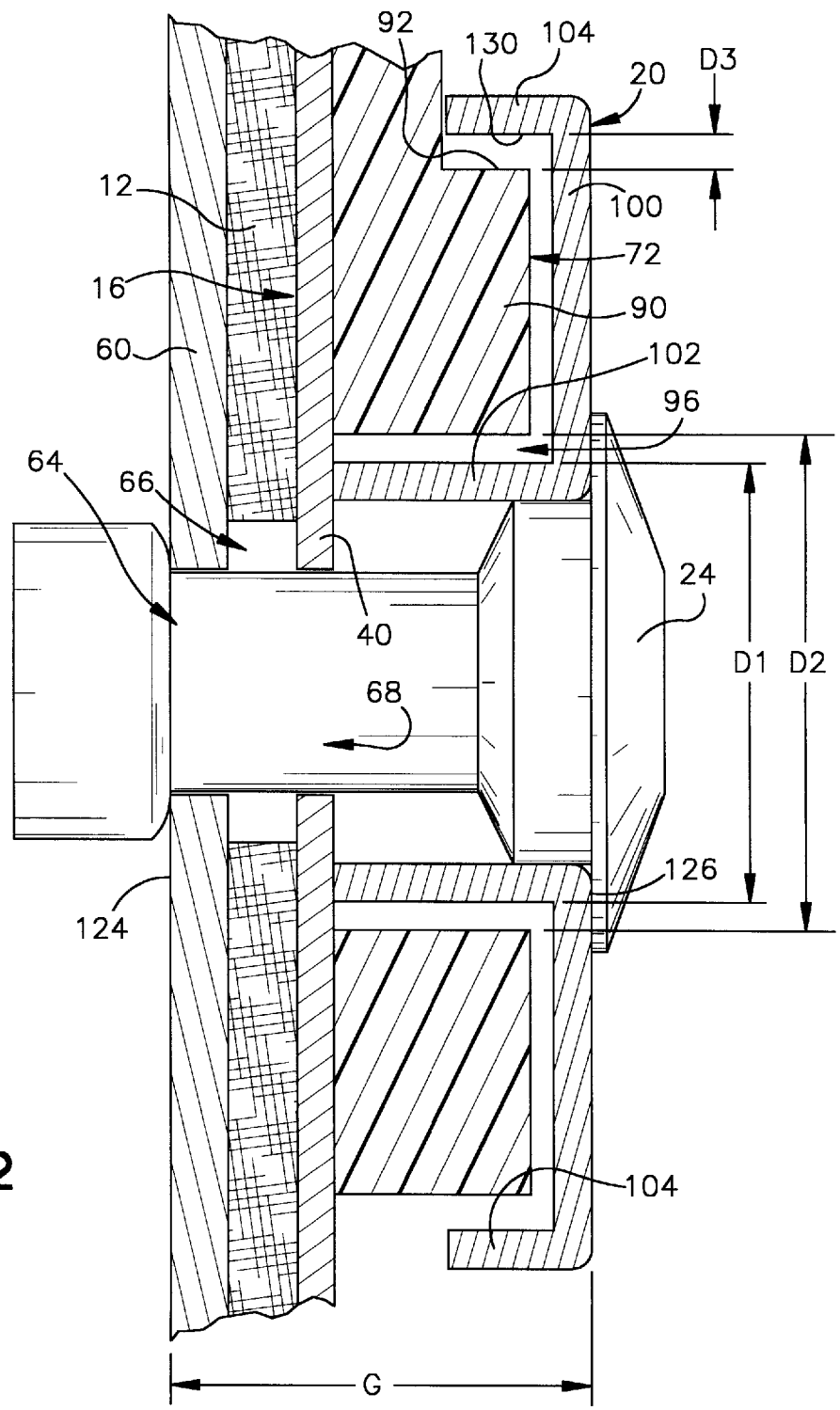
FIG. 2 is an enlarged, partly sectional view of interconnected parts of the module.

Next, the first retainer structure 20 is moved toward and against the first side wall 40 of the canister. Each sleeve 102 on the first retainer structure 20 is received through a corresponding aperture 96 in the first mounting wall 72. As shown in FIG. 2 with reference to one of the sleeves 102, each sleeve 102 on the first retainer structure 20 extends longitudinally into abutment with the first side wall 40 of the canister 16. The second retainer structure 22 is likewise moved toward and against the second side wall 42 of the canister 16, with the sleeves 116 on the second retainer structure 22 being received through the apertures 96 in the second mounting wall 74 in the same manner. The differing arrangements of the apertures 96 and sleeves 102 and 116 at the opposite sides of the canister 16 ensure that the deployment structure 18 is received in the correct orientation relative to the canister 16.

The fasteners 24 in the preferred embodiment of the present invention are rivets. As indicated by dashed lines in FIG. 1, the rivets 24 are received through the sleeves 102 and 116, and further through the apertures 60–68 that are aligned inward of the sleeves 102 and 116.

As shown by way of example in FIG. 2, each rivet 24 is engaged between the retainer frame 60 at the inside of the canister 16 and a retainer structure 20 (or 22) at the outside of the canister 16. More specifically, each rivet 24 has a grip G extending from an inner side 124 of the retainer frame 60 to an outer end 126 of a retainer sleeve 102 (or 116). The rivets 24 are engaged in this manner so as to clamp the retainer frame 60, the air bag 12, the canister 16, and the retainer structures 20 and 24 together along the side walls 40 and 42 of the canister 16.

As further shown by way of example in FIG. 2, the sleeves 102 and 116 have outer diameters D1 which are substantially less than the inner diameters D2 of the apertures 96. This enables at least one of the sleeves 102 and 116 to be spaced fully from the mounting wall 72 or 74 within the corresponding aperture 96. This feature of the present invention provides clearance for limited floating movement of the mounting walls 72 and 74 about the peripheries of the sleeves 102 and 116 within the apertures 96, and thus provides clearance for limited floating movement of the entire deployment structure 18 relative to the parts that are clamped together by the rivets 24. Such movement may be helpful for fitting the deployment panel 70 closely into the opening in the vehicle instrument panel, as described above, when the canister 16 has been mounted in the instrument panel.

Another feature of the present invention is shown in FIG. 2 with reference to the first retainer structure 20. As noted above, the lower edge portion 90 of the first mounting wall 72 has a shoulder surface 92. The shoulder surface 92 faces in a direction extending outward relative to the deployment opening 48 (FIG. 1) in the canister 16. An adjacent flange 104 on the first retainer structure 20 has an inner side surface 130 facing oppositely inward toward the shoulder surface 92. The inner side surface 130 is spaced from the shoulder surface 92 a distance D3 which is slightly greater than the difference between the diameters D1 and D2. Accordingly, the flange 104 is located outside the range through which the shoulder surface 92 is movable toward and away from the inner side surface 130 during floating movement of the first mounting wall 72 relative to the sleeve 102. However, the flange 104 blocks further movement of the first mounting wall 72 when the air bag 12 moves against the deployment panel 70 upon inflating outward from the deployment opening 48.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a plurality of parts which are clamped together by a fastener, said parts including a reaction canister, an air bag inside said canister, a retainer frame inside said air bag, and a retainer sleeve outside said canister, said fastener extending through said retainer sleeve; and a deployment structure supported for limited movement relative to said canister, said deployment structure having a panel portion extending across a deployment opening in said canister, said deployment structure further having a mounting portion projecting from said panel portion; said retainer sleeve extending through an aperture in said mounting portion of said deployment structure and being spaced fully from said deployment structure within said aperture, whereby clearance for said movement is provided about the periphery of said retainer sleeve.

2. Apparatus as defined in claim 1 wherein said fastener is a rivet having a grip extending from an inner side of said retainer frame to an outer end of said retainer sleeve.

3. Apparatus as defined in claim 1 wherein said aperture is one of a row of equally sized apertures, said retainer sleeve being one of a row of equally sized retainer sleeves which are interconnected by a retainer strip, each of said sleeves extending from said strip into abutment with said canister through a corresponding one of said apertures.

4. Apparatus as defined in claim 3 wherein said mounting portion of said deployment structure has a shoulder surface facing in a direction extending outward relative to said deployment opening, said retainer strip having a flange portion with an inner side surface, said inner side surface being located adjacent to said shoulder surface and facing oppositely inward toward said shoulder surface.

5. Apparatus as defined in claim 4 wherein each of said retainer sleeves has an outer diameter, each of said apertures having an inner diameter greater than said outer diameter, said inner side surface of said flange being spaced from said shoulder surface a distance which is greater than the difference between said inner and outer diameters.

* * * * *